United States Patent [19]

Fürstenau

[11] Patent Number: 4,886,361
[45] Date of Patent: Dec. 12, 1989

[54] FLAT TACTILE SENSOR

[75] Inventor: Norbert Fürstenau, Braunschweig, Fed. Rep. of Germany

[73] Assignee: Versuchsanstalt fur Luft, Cologne, Fed. Rep. of Germany

[21] Appl. No.: 193,551

[22] Filed: May 12, 1988

[30] Foreign Application Priority Data

May 12, 1987 [DE] Fed. Rep. of Germany ....... 3715693

[51] Int. Cl.$^4$ ................................................ G01B 9/02
[52] U.S. Cl. ..................................... 356/345; 250/227; 901/33; 901/47
[58] Field of Search ....................... 356/345; 250/227; 901/33, 47

[56] References Cited

U.S. PATENT DOCUMENTS

| | | | |
|---|---|---|---|
| 4,692,610 | 9/1987 | Szuchy | 356/32 X |
| 4,720,535 | 9/1988 | Kim et al. | 356/345 |
| 4,733,068 | 3/1988 | Thiele et al. | 250/227 |
| 4,743,113 | 5/1988 | Jubinski | 356/345 |
| 4,767,210 | 8/1988 | Kashyap | 356/345 |

FOREIGN PATENT DOCUMENTS 2141821 4/1983 United Kingdom.

OTHER PUBLICATIONS

IEEE Spectrum, Aug. 1985, pp. 46–52 P. Dario and D. DeRossi, Tactile sensors and the gripping challenge The International Journal of Robotics Research, vol. 1, No. 2, Summer 1982.

Leon D. Harmon, *Automated Tactile Sensing* Technisches Messen 51/1984, No. 6, pp. 205–212.

R. Kist, *Assessment of meterorogical parameters by means of fiber-optic sensors* DFVLR-FB 85-56.

N. Furstenau, *Aufbau faseroptischer Zweistrahlinterferometer und Untersuchungen zur Dehnungs-und Temperaturempfindlichkeit* OFS'86, Tokyo.

N. Furstenau, *Fiber Optic Two-Polarization Michelson Interferometer as Remote Digital Displacement Sensor,* SPIE, vol. 630 Fibre Optics '86.

N. Furstenau, *Fiber Optic Two Polarization Interferometer with Unambiguous Digital Readout and its Application as Remote Strain Sensor.*

Primary Examiner—Davis L. Willis
Assistant Examiner—Matthew W. Koren
Attorney, Agent, or Firm—Salter & Michaelson

[57] ABSTRACT

A description is given of a tactile sensor for measuring force with fine resolution which is based on a network of glass fiber optic interferometers. The counting of interference fringes as readout method makes available an inherently digital (incremental) output signal which allows the measured signal to be passed on optically free of interference to evaluation electronics and to data processing. In conjunction with a suitable elastic skin to accept the glass fiber network, the small glass fiber diameter (125 $\mu$) and the user of the strain measurement technique employing glass fiber interferometers should make possible a tactile sensor comparable with the human sense of touch. The fields of application for such tactile sensors are robotics, prostheses and advanced controls at the man-machine interface.

7 Claims, 2 Drawing Sheets

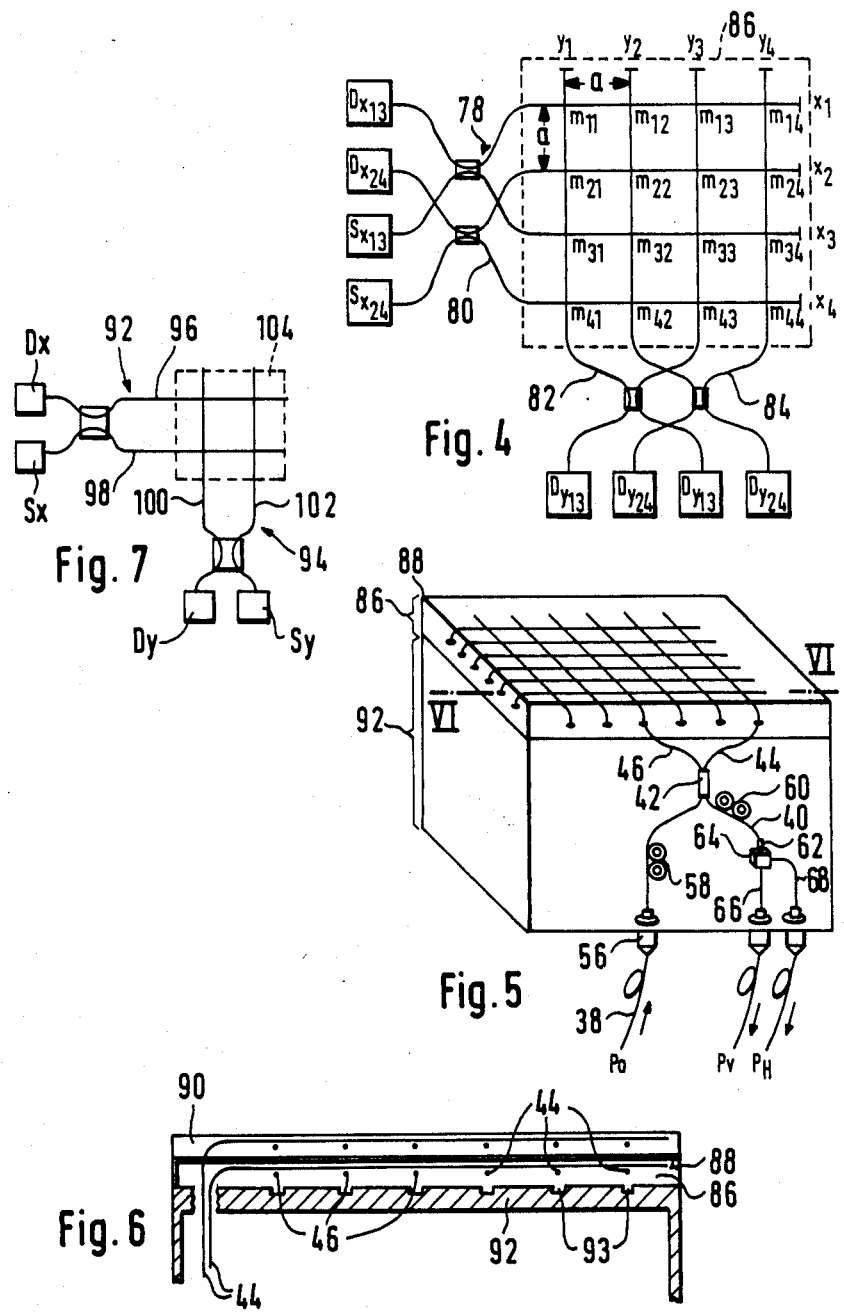

FLAT TACTILE SENSOR

BACKGROUND OF THE INVENTION

The invention relates to a flat tactile sensor having a network of optical fibers between a flat support and an elastomer layer resting thereon, which are respectively arranged to be parallel, and to cross each other at an angle, and having a readout unit for capturing the changes in intensity of the light fed into the optical fibers.

DESCRIPTION OF THE PRIOR ART

To extend their area of application, modern robotic systems require tactile sensors, which measure with fine resolution in a way analogous to human touch the force distribution affecting a robot gripper. In doing so, such sensors provide the input signals for the control circuits of the robotic systems.

Taking the tactile capabilities of the human fingers as a means of orientation concerning the demands on tactile sensors, an approximation to the following criteria is to be aimed at:

minimum detectable force $3.6 \cdot 10^{-4}$N (corresponding to a weight of 36 mg);

maximum precision at $1-8 \cdot 10^{-2}$N with resolvable force differences of 15–20%;

fine resolution (two-point resolution) 1–2 mm, so that one finger typically corresponds to a 15×20 sensor array.

In a known sensor of the type mentioned at the beginning (GB-A-2,141,821) the network consists of crisscrossed multimode glass fibers, in which, in each case, light is fed in via light-emitting diodes at one end and a photodiode is connected to the other end, in each case. The fibers are bent via pressure on the sensor. This leads to changes in the intensity of the light fed into the fibers by the light-emitting diodes. The effective force is determined by measuring the transported light intensity. By virtue of the criss-cross arrangement of the fibers, the action of the force can be located in space. With such a sensor, flexures to which the fibers are subjected outside the sensor also lead to changes in intensity. It is not possible, therefore, to distinguish changes in intensity inside the region of the sensor from such as occur owing to fiber flexure outside the region of the sensor.

Further, a sensor is known (Journal IEEE Spectrum, August 1985, p. 49), in which there is a rigid body provided with a matrix having openings in which the ends of the fibers are fixed in each case. In the elastic covering opposite the openings is arranged in each case a recess, the base of which is provided with an optically reflective coating. When pressure is exerted on the membrane, the optical reflection is changed, and a signal is thereby emitted. In this connection, the change in the reflectivity depends on the nature of the deformation of the reflective surface, which, in turn, depends on the location at which the force acts on the elastic covering.

SUMMARY OF THE INVENTION

It is the object of the invention to design a flat tactile sensor of the type mentioned at the beginning in such a way that for very fine lateral resolution it is simultaneously possible to achieve a high resolution of force and a measure as precise as possible for the absolute value of the effective force, and that flexures in the fiber sections lying outside the sensor do not affect the result of measurements.

This object is achieved according to the invention in that the network consists of arms of fiber optic two-arm interferometers, both arms of the two-arm interferometer are arranged as measuring arms on the support and the readout unit has a circuit for counting interference fringes.

Expedient designs are the subject of the sub-claims.

The construction of fiber optic two-beam interferometers is known, and investigations are to hand, moreover, on the sensitivity of such interferometers to strain and temperature—DFVLR-FB 85-86, 1985; Proceedings "Fiber Optics 86", SPIE, Volume 630, L. R. Baker, ed. Bellingsham, Washington (1986), pages 220–224; Proceedings "OFS" 86, Tokyo, the Institute of Electronics and Communication Engineers of Japan, Tokyo (1986), pages 291–294.

BRIEF DESCRIPTION OF THE DRAWINGS

The invention is illustrated in terms of examples in the drawing, and described in detail below with reference to the drawing, in which:

FIG. 4 shows a schematic representation of a tactile sensor with a network of four fiber optic Michelson interferometers.

FIG. 5 shows a three-quarter view of a tactile sensor with a network of six fiber optic Michelson interferometers.

FIG. 6 shows a section along the line VI—VI in FIG. 5, with an additional arrangement of fiber optic interferometers for measuring temperature with fine resolution.

FIG. 7 shows a schematic representation of a tactile sensor with a network of two fiber optic Michelson interferometers.

DESCRIPTION OF THE PREFERRED EMBODIMENTS

Figure 1:
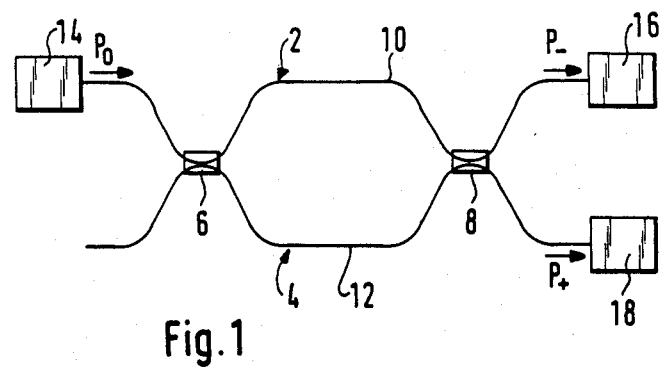
FIG. 1 shows a schematic representation of a fiber optic Mach-Zehnder interferometer.

The fiber optic Mach-Zehnder interferometer represented in FIG. 1 has two parallel optical fibers 2, 4, each of which is routed through two 3 dB monomode couplers 6, 8, arranged at a distance from one another. The two fiber lengths of fiber arms 10, 12 between the couplers 6 and 8 form the measuring and reference arm of the interferometer. Light having an input power $P_0$ is fed into the fiber 2 from a light source 14, preferably a laser light source. This light is coupled in or out of the fiber 4 by means of the couplers 6 and 8. The output power $P_-$ and $P_+$ at the opposite end of the fibers 2 and 4 is given to the photodetectors 16, 18. Strains in one of the arms (=measuring arm) 10 or 12 relative to the other arm (=reference arm) lead to a change in the difference of the optical path length between 10 and 12, and thus to a change in intensity that can be measured with the photodiodes 16, 18.

Details will be given further below.

Figure 2:
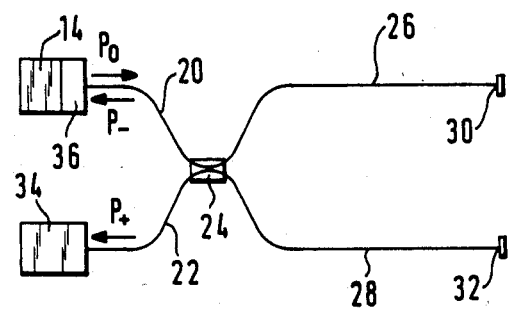
FIG. 2 shows a schematic representation of a fiber optic Michelson interferometer.

In the fiber optic Michelson interferometer, represented schematically in FIG. 2, two optical fibers 20, 22 are likewise provided, which are routed through a fiber optic 3 dB monomode coupler 24. Measuring and reference arm 26, 28 are silvered at their ends 30, 32 so that the light is reflected. Here, too, light, preferably laser light, having a power $P_0$ is fed into the fiber 20 from a light source 14. This light is reflected via the mirrors 30, 32, and the output power $P_-$ or $P_+$ is given to a photodetector 34 at the other end of the glass fibers 20, or absorbed by an optical isolator 36 in front of the light source 14 (for example a laser diode), in order to avoid instabilities. Instead of silvered end faces 30, 32 of the fibers 26, 28, it is also possible to provide mirrors.

Figure 3:
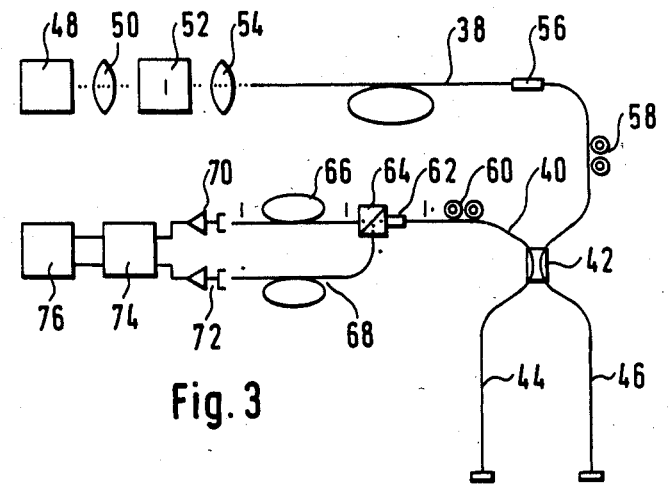
FIG. 3 shows a schematic representation of a two-polarization Michelson interferometer with readout device.

The Michelson type two-polarization interferometer 10 according to FIG. 3 shows the complete wiring of such an interferometer in the form of a block diagram. Laser light is fed into the fiber 38, which has the form of a polarization preserving monomode fiber, via a laser 48, which is designed either as a laser diode or as an He-Ne gas laser, via a first microscope objective 50 or a suitable lens, an optical isolator 52 and a second microscope objective 54. This supply unit is connected to the input arm of the interferometer via a splice or a monomode fiber plug-and-socket connector 56. The input arm and the fibers 40, which are routed through the fiber optic 3 dB monomode coupler 42, are silvered at the ends of the sections 44, 46, which form the measuring and reference arms, respectively. A fiber optic polarization control 58 is arranged between the plug-and-socket connector 56 and the coupler 42. A corresponding polarization control 60 is arranged in the fiber 40, which is connected to a Gradient-index lens 62, behind which is arranged a polarization beam splitter 64. To the outputs of this splitter 64 there is connected, in each case, a multimode fiber 66 for the vertical, and a multimode fiber 68 for the horizontal components of the output intensity. Instead of the combination 62, 64 it is also possible to use a fiber optic polarization beam splitter between 40 and 66, 68. The multimode fibers 66 or 68 can be plastic fibers. In each case, they are connected to a photodiode-preamplifier combination 70, 72, the outputs of which are switched to readout electronics 74, to which is joined an up-down counter 76.

The sensor elements have the function of fiber optic strain sensors. In terms of the corresponding relative phase shift of the light waves in the two arms, they measure the change in optical path caused by the flexure-induced strain of one of the two interferometer arms (measuring arm) relative to the unaffected (reference) arm. By means of superposition of the two light waves in a fiber optic coupler, the phase shift is converted into a change in intensity (the interference signal), that can be measured with a photodiode. In the simplest case, the output intensities from the two output arms of the Mach-Zehnder interferometer or Michelson interferometer have the following form:

$$I_\pm = \tfrac{1}{2}(1 \pm \cos \Delta\phi), \tag{1}$$

the two intensities being distinguished by the algebraic sign. $\Delta\phi$ is the phase difference between the two arms $$\Delta\phi = \frac{2\pi}{\lambda_o} \Delta(nL) \tag{2}$$

where $\lambda_0$ is the vacuum wavelength, n the refractive index, and L the geometrical length. The interference signal can be read out in the form of alternations of brightness and darkness. For example, counting the brightness maxima passing at the detector yields an absolute measure for the strain, if the initial value (for example counter reading=0 for unloaded fiber) is preset.

The strain $\epsilon = \Delta L/L$ parallel to the fiber longitudinal axis that is required for an alternation between two neighboring interference maxima of the intensity is taken as the sensitivity to strain. It corresponds to a phase shift between the light waves in the two interferometer arms of $\Delta\phi = 2\pi$. In general, we have $$\frac{\Delta\phi}{\phi} = \epsilon[1 - 0.5\, n^2 (p_{12}(1 - \nu) - p_{11}\nu)], \tag{3}$$

the material parameters of refractive index n, elasto-optic constants $p_{11}$, $p_{12}$ and Poisson number $\nu$ being a function of wavelength and available from the literature.

When $\lambda_0 = 786$ nm (semiconductor laser diode) the following holds for a Mach-Zehnder interferometer:

$$\frac{\Delta L}{\Delta\phi} = \frac{0.684\ \mu m}{2\pi\ \text{rad}}. \tag{4}$$

In the case of the Michelson interferometer as sensor element, the sensitivity is doubled, because the light waves traverse the extended fiber section twice. The sensitivity can be doubled a further time, if in addition to the interference maxima the minima are counted or if the zero crossings of the signal according to equation (1) are counted, the constant fundamental intensity having been previously subtracted (electronically).

The longitudinal strain of a fiber fixed at the ends and subjected to stress by a force acting transverse to the longitudinal axis of the fiber is given, for small deflections $\Delta H$, by the quadratic relationship:

$$\epsilon \simeq 2\left(\frac{\Delta H}{L}\right)^2. \tag{5}$$

The order of magnitude of the maximum permissible strain is determined by the breaking limit. A value of $$\epsilon_{max} = 0.4\% \tag{6}$$

can be taken as a reliable value, applying also to long-term stresses. For a typical value of L=5 cm, the maximum deflection transverse to the fiber axis is obtained as $$\Delta H_{max} = 2.2\ \text{mm}. \tag{7}$$

With these values, there is a digital resolution of at least 8 bit, the corresponding number of increments being distributed quadratically over the measuring area, as befits the case described here (5).

The basic principle of the interferometric sensor element as described above still does not enable the algebraic sign of the change in the measurand in association with incremental readout to be recognized, because the counting process itself sums up only absolute values (number of intensity maxima).

The problem of the recognition of the algebraic sign can be solved in various ways, which are known and described in the literature. The methods are based on producing two interference signals which are phase-shifted by, for example, $\pi/2$, but are otherwise identical and are recorded simultaneously with two detectors. With reverse of the algebraic sign of the measurand, the algebraic sign of the phase shift also reverses, and this can be recorded by means of a simple logic circuit. Dependent on the algebraic sign, the circuit carries the counting pulses into either the up or down input of an up-down counter, so that the counter reading gives the fiber strain in relation to the initial condition.

The production of a second, phase-shifted interference signal can be effected electronically (by differentiating the signal downstream of the detector) or optically. An optical method is to be preferred because of the naturally enhanced noise in the differentiated signal. One possibility is based on splitting the output light wave of the interferometer into two orthogonally polarized components by means of a polarization beam splitter, which is realized in FIG. 3 by the polarization beam splitter 64 or alternatively in a fiber optic fashion. The desired phase shift can be set between these two fractions of the interference signal which are to be read out separately, for example, by selecting a suitable polarization of the input wave into the interferometer by means of the polarization regulator 58.

The two phase-shifted, orthogonally polarized (for example horizontally H and vertically V) output light waves are described by the following equations for the intensities:

$$I_{H\pm} = \frac{1}{4} I_{oH} [|a_H|^2 + |b_H|^2 \pm 2|a_H b_H^*| \cos\{\Delta\phi + \text{arc}(a_H b_H^*)\}] \quad (8a,b)$$

$$I_{V\pm} = \frac{1}{4} I_{oV} [|a_V|^2 + |b_V|^2 \pm 2|a_V b_V^*| \cos\{\Delta\phi + \text{arc}(a_V b_V^*)\}].$$

$a_{H,V}$ and $b_{H,V}$ are complex functions of the input polarization, birefringence of the fibers and of the angle between the fast or slow fiber axes and the axes H, V of the polarization beam splitter.

In essence, the measurand M affecting the measuring arm of the interferometer influences only the phase term $\Delta\Phi$, insofar as the birefringence of the fibers does not change too strongly. The phase difference between the output intensities $I_H$, $I_V$, which is independent of the measurand, is then given by the angular difference $$\Delta\phi = \text{arc}(a_H a_H^*) - \text{arc}(a_V a_V^*). \quad (9)$$

For the purpose of recognizing the algebraic sign (distinguishing between strain or unloading of the measuring fiber ($+$ or $-$) or distinguishing between strain of the measuring or reference fiber) by means of the logic unit of the readout electronics, we set $\Delta\phi = \pm\pi/2$. $\Delta\phi$ changes its algebraic sign with change in the algebraic sign of the variation of the measurand.

The setting of the $\Delta\phi$ is done by setting a suitable input polarization by means of the fiber optic polarization control 58—FIG. 3—in the input fiber. the intensity ratio $I_{+H}/I_{+V}$ between the output fibers 66, 68 can be set using the polarization regulator 60.

A tactile sensor constructed from four two-arm interferometers of the Michelson type is shown schematically in FIG. 4. The four interferometers 78, 80, 82, 84 are shown in the simplified representation corresponding to FIG. 2. The arms of the interferometers, which both function as measuring arms and are therefore also designated as measuring arms in the following, are embedded in an elastomer layer 86, or arranged under an elastic membrane in contact with the latter, which layer is indicated here by its dotted outline, and which is attached, in turn, to a rigid support 92 (cf. FIG. 5). The embedding is done in such a way that the glass fibers forming the measuring arms are stressed in the axial direction and fixed in or under the layer. The arrangement of the measuring arms has the form of a network with equal spacings a between the measuring arms which are arranged to run parallel, namely $x_1-x_4$ in the horizontal direction and $y_1-y_4$ in the vertical direction in the representation according to FIG. 4. In this connection, the measuring arms $x_1/x_3$, $x_2/x_4$, $y_1/y_3$ and $y_2/y_4$ of the interferometers are arranged at a spacing $2a$, so that between the arms of one interferometer, there is, in each case, arranged an arm of the other interferometer. This reduces the undesirable mechanical coupling between associated measuring and reference arms of the interferometers, which is conveyed by the elastic skin. Altogether, the network of the arms of the four interferometers has 16 points of intersection $m_{11}-m_{44}$. At these points of intersection the fibers lie spaced above one another in the elastic covering, so that there is no direct contact between the fibers at the points of intersection.

The points of intersection of the interferometer arms define a matrix of measuring points $m_{ij}$, formed by the points of intersection, which make it possible to measure force with fine resolution given a sufficient mechanical decoupling between the two arms of the individual sensor elements. In the ideal case, a force $F_{ij}$ acts on one of the points $m_{ij}$, leading to a strain in the interferometer arms $x_i$, $y_j$. The point $m_{ij}$ is uniquely determined by the counters mentioned and the algebraic signs of the changes in counter reading.

For example, an orthogonal component of force $f_z(x,y) = F_{23}$ acts on the point $m_{23}$. In this connection, it is assumed that there is sufficient mechanical decoupling between the individual measuring points $m_{ij}$, for example through suitable fixing in the "skin", which serves to receive the glass fibers.

The detectors $d_{x24}$ and $D_{y13}$ then record a measuring signal. It is assumed that the strain of the fibers $x_{1,2}$, $y_{1,2}$ delivers positive counting pulses and that the strain of the fibers $x_{3,4}$, $y_{3,4}$ delivers negative counting pulses (see above). Working from measuring point $m_{23}$ in the next stage, the detector unit $D_{x24}$ records positive ($N_{x2}$), and $D_{y13}$ negative ($N_{y3}$) counting pulses. Since each of the, in each case, two readout units for the x and y co-ordinates can distinguish the algebraic signs of the two allocated interferometer arms, it is possible to distinguish all sixteen measuring points uniquely using four readout units.

Generally, it will be not a point force, but a force distribution f(x,y) which acts on the tactile sensor. Here, situations are conceivable in which no measuring signals will be produced despite $f(x,y) \neq 0$. This will always be the case if both interferometer arms of a sensor element are simultaneously strongly strained to the same extent. The task in designing the sensor consists in guaranteeing for all force distributions that arise a sufficient decoupling of the in each case two arms of the sensor elements. As described above, one possibility consists in making the distance between the two arms greater, namely greater than the maximum lateral strain occurring in the distribution f(x,y). Another possibility is to arrange one of the two arms of the sensor elements insulated on the side of the elastic skin turned away from the force, so that in each case only one arm is strained, and therefore functions as measuring arm while the other arm functions as reference arm. However, with the same fine resolution this requires double the number of interferometers and readout units (detectors, readout electronics, counters). The first solution is therefore to be preferred, insofar as this is permitted by the measuring task. Sensor characteristics, such as measuring range, fine resolution and frequency response are essentially co-determined through the "skin", in which the interferometer arms are embedded. Silicone rubber, latex and neoprene are examples of materials that have been examined in the literature for an elastic skin in tactile sensors. In this connection, the stress-deformation characteristic curve of neoprene exhibits the lowest hysteresis, so that this material seems to be best suited.

Again, generally speaking the elastic properties of the skin entail that, even for a force acting only at a point, more than one sensor element will deliver an output signal, depending on the spacing of the sensor arms of the individual interferometers.

There are several, mutually complementary methods for the quantative determination of a measured unknown force distribution. On the one hand, the measured values registered by the counters can be converted into the force distribution (force matrix) using an analytical model of the sensor and scaling measurements (sensitivity to deformation, couplings between interferometer arms, etc.). Because of the possible couplings between the individual sensor elements, which are transmitted via the elastic skin on occasion, a more expensive, computer-aided evaluation of the measured data may be necessary. In this connection, a type of expert system for tactile sensations could identify the unknown force distribution by comparing the measured values (counter readings) with a standard distribution stored in a data bank.

If not only orthogonal forces (with reference the sensor surface), but also arbitrary force vectors act on a tactile sensor, it would be advantageous to be able to distinguish tangential (shear) components from orthogonal components. Given the principle described here, this is possible during the data processing via the different stress-strain characteristic curves for orthogonal forces (quadratic dependence of the fiber strain on the flexure, see (5)) and tangential forces (fiber strain proportional to the applied mechanical stress).

For an arrangement with six interferometers, as represented in FIG. 5, the spacings of the measuring arms of the individual interferometers are $3a$ in each case. In each case, then, one measuring arm of the two other interferometers lies between these measuring arms. The figure shows one of the altogether six interferometers with the wiring as two-polarization interferomweter. A corresponding wiring is also envisaged for the other interferometers. Here, individual components of the wiring correspond to those described above with reference to FIG. 3. Accordingly, the same reference numerals are also employed for the same parts. When a force acts, the flexure of the fibers is restricted by the rigid housing 92, which serves to receive the optical components of the six interferometers.

It is known that, next to the mechanical strain, a thermal strain causes the greatest measuring effect when there are temperature differences between interferometer arms of the sensor elements. Consequently, the sensor must be constructed in such a way that temperature influences are essentially suppressed or compensated. For a setup according to FIG. 4 or 5, in which the two arms of the interferometers serve as measuring arms, this can, for example, be achieved with a (metal) layer which is a good conductor, on the elastic skin. This layer essentially compensates locally inhomogeneous temperature distributions, so that the two arms of the sensor elements are exposed to the same temperature and do not deliver a temperature-induced signal.

In accordance with FIG. 6, an elastic film 88, made of material which is a good conductor, is arranged on the topside of the elastomer layer 86. A Mylar film, for example, can be provided for this purpose. The thermal compensation which has been mentioned then takes place over the surface of the sensor via this layer 88. The rigid support 92 is provided with depressions 93 into which the glass fibers are pressed during maximum flexure of the elastomer layer, in order to prevent birefringence induced by transverse stress or damage in conjunction with transverse forces that are too strong.

In addition, the tactile sensor can be provided with a temperature sensor. Such a temperature sensor can likewise be assembled from a network consisting of the measuring arms of a plurality of interferometers, which, in their turn, lie in an elastic layer 90 which, as represented above in FIG. 6, is arranged above the heat conducting film 88. In this connection, the number of interferometers in the layers 86 and 90 can be identical. However, it could also be different. Given the locally different thermal action, different thermal strains arise in the measuring arms, leading, in their turn, to phase shifts, which in this case are a measure of the local temperature concerned.

By contrast with the plane of the network lying below, the arms of the interferometers in the network in the layer 90 are, in addition, directly exposed to the temperature distributions at the sensor surface, and experience deformation through the action of force. The measured temperature distribution is derived by combining the measured values from the two sensor planes (essentially subtraction of the appropriate counter readings from the two planes).

A further embodiment of a sensor is shown in FIG. 7. Here, it is a question of a point sensor which operates with two interferometers 92, 94, according to FIG. 1 or 2. The two glass fibers 96, 98, or 100 and 102, which function as measuring arms and are embedded stressed in the elastic layer 14 or are arranged beneath an elastic membrane in contact with the latter are, once again, parallel to one another and the measuring arms of the two interferometers cross one another as in the embodiments according to FIGS. 4 and 5. If the sensor according to FIG. 7 is actuated at the point of intersection of the two diagonals through the points of intersection of the measuring arms, that is concentrically, then in each case the two measuring arms of the interferometers are strained to the same extent. Consequently, the output signal is equal to zero. If actuation takes place outside the center point, different strains arise in the two interferometers, from which the point of actuation can be determined locally, insofar as for repeated measurements the flexure of the elastic layer is identical and known, in each case. This applies to the entire sensor area formed here by the areas of the elastic layer 104. The wiring of the interferometers corresponds to that of the other embodiments.

The sensors according to the invention have the advantage that flexural stresses of the input and output arms of the interferometers lying outside the sensor area do not affect the measured result.

I claim:

1. A flat tactile sensor comprising at least one pair of fiberoptic interferometer-type sensing elements, each of said sensing elements including an input measuring arm having a sensing portion and an input end remote from the sensing portion thereof, an input light source for the input measuring arm at the input end thereof, an output measuring arm having a sensing portion and an output end remote from the sensing portion thereof and a readout measuring means at the output end of the output measuring arm thereof, each of said sensing elements including a monomode directional coupler for coupling the input and output measuring arms thereof, the sensing portions of the measuring arms of each of said sensing elements being substantially straight and being disposed in substantially parallel spaced relation to each other, the sensing portion of each of the measuring arms of one sensing element of said pair of sensing elements being disposed in spaced, angular crossing relation with respect to the sensing portion of one of the measuring arms of the other sensing element of said pair, said sensor further comprising support means for supporting the sensing portions of said measuring arms, said support means including a support surface and an elastic layer on said support surface, said elastic layer supporting said sensing portions so that the sensing portions of different sensing elements are normally spaced in a direction toward said support surface but so that said sensing portions are flexible in a direction toward said support surface to alter the respective lengths of said sensing portions, the readouts of said sensing elements each including means for counting the interference fringes generated as a result of the differences in the lengths of the respective sensing portions thereof.

2. In the sensor of claim 1, said measuring arms being embedded in said elastic layer.

3. The sensor of claim 1 further comprising at least two pairs of said sensing elements, the sensing portion of at least one measuring arm of one sensing element of each pair of sensing elements being substantially parallel to and interposed in substantially equidistant, substantially parallel relation between the sensing portions of the measuring arms of a sensing element of a different pair of sensing elements.

4. In the sensor of claim 1, said sensing elements further characterized as Mach-Zehnder type inferometers.

5. In the sensor of claim 1, said sensing elements further characterized as Michelson-type inferometers.

6. The sensor of claim 1 further comprising a heat-conductive metal foil on said elastic layer adjacent said measuring arms.

7. In the sensor of claim 6, said elastic layer further characterized as a first elastic layer, said sensor further comprising a second elastic layer on said metal foil and a plurality of interferometer-type temperature sensing elements, the sensor portions of the measuring arms of said interferometer-type temperature sensing elements being embedded in said second elastic layer.

* * * * *